(12) United States Patent
Williams (10) Patent No.: US 6,493,444 B2
(45) Date of Patent: Dec. 10, 2002

(54) ENHANCED APPLICATION TELEPHONE NETWORK

(75) Inventor: L. Lloyd Williams, Kanata (CA)

(73) Assignee: Bell Canada, Montreal (CA)

( * ) Notice: Subject to any disclaimer, the term of this patent is extended or adjusted under 35 U.S.C. 154(b) by 0 days.

(21) Appl. No.: 09/268,843

(22) Filed: Mar. 16, 1999

(65) Prior Publication Data

US 2002/0071543 A1 Jun. 13, 2002

(51) Int. Cl.$^7$ .............................................. H04M 7/00
(52) U.S. Cl. ........................ 379/221.08; 379/221.09; 379/221.1; 379/220.01
(58) Field of Search ........................ 379/219, 220.01, 379/221.01, 221.08, 221.09, 221.1

(56) References Cited

U.S. PATENT DOCUMENTS

| | | | |
|---|---|---|---|
| 4,191,860 A | 3/1980 | Weber | 179/18 B |
| 5,185,786 A | 2/1993 | Zwick | 379/201 |
| 5,291,552 A | 3/1994 | Kerrigan et al. | 379/266 |
| 5,377,186 A | 12/1994 | Wegner et al. | 370/62 |
| 5,633,924 A | 5/1997 | Kaish et al. | 379/266 |
| 5,684,872 A | 11/1997 | Flockhart et al. | 379/266 |
| 5,742,675 A | 4/1998 | Kilander et al. | 379/265 |
| 5,754,627 A | 5/1998 | Butler et al. | 379/63 |
| 5,778,060 A | 7/1998 | Otto | 379/265 |
| 6,226,289 B1 * | 5/2001 | Williams et al. | 370/385 |

* cited by examiner

*Primary Examiner*—Creighton Smith
(74) *Attorney, Agent, or Firm*—Alston & Bird LLP (57) ABSTRACT

An enhanced application switched telephone network and a method of completing calls using the network are described. In the enhanced application switched telephone network, every switching office is connected to at least one enhanced ISUP voice-grade trunk. A link set and a route set associated with the enhanced trunk route common channel signaling messages associated with calls directed to the enhanced trunk(s) to a call control node. The call control node is thereby enabled to exercise control over those calls. The advantages include point of origin call control, enhanced application service development, rapid service, deployment and significantly more efficient use of PSTN facilities.

27 Claims, 8 Drawing Sheets

ENHANCED APPLICATION TELEPHONE NETWORK

FIELD OF THE INVENTION

The present invention generally relates to telephone network architectures and, in particular, to an enhanced application telephone network architecture in which "enhanced" voice grade trunks are ubiquitously provisioned to route selected calls through call control nodes enabled to selectively exercise control over those calls.

BACKGROUND OF THE INVENTION

Use of the telephone as a social and business instrument has exponentially grown over the past 100 years. The widespread acceptance of the telephone and its uses have spurred industry to create many innovations to facilitate call completion and enhance telephone services. Today's telephone user community is sophisticated in the use of telecommunications equipment and demands faster connections, more services and better integration with computer applications to assist in streamlining their business operations.

The Public Switched Telephone Network (PSTN) as evolved to a highly automated computer-controlled switched network which permits callers to place calls to practically anywhere in the world. In this document, use of the term PSTN is intended to refer to any intelligent switched telephone network.

Advanced Intelligent Networks (AIN) now play a significant role in call routing in the PSTN and number portability will dramatically increase database control of initial call routing. In AIN, standardized "triggers" in the network switching nodes permit call requests to trigger database queries for seeking call routing information. After call routing information is returned from a queried database, the call is connected through the network using standard call processing procedures.

Although the AIN is a high-speed multifaceted network which provides a vast array of automated telephone services, service development in the AIN is channelled by the AIN call model. In the AIN, new service development is accomplished using Service Creation Environments to create service logic programs that are executed by Intelligent Service Control Points (ISCPs), which are databases that respond to switch queries initiated by the AIN triggers. In the AIN call model the opportunities for initiating routing decisions are essentially limited to the trigger points embedded in the network call processing logic. Although the services offered in the PSTN are constantly being expanded and enhanced, new services are now routinely developed within the context of the AIN call model.

One disadvantage of the AIN call model is that many calls are routinely completed through the network only to be blocked or re-routed to a new termination. Popular services such as call screening and call forwarding work in this way. Consequently, congested network circuits are unnecessarily reserved for calls that are never completed to the dialed number, or redundant circuits are used to complete calls forwarded to a termination at another switching office.

The computer communications industry and the telecommunications industries are beginning to merge, but there has always been a measure of difficulty with the integration of the two. The PSTN has been perceived by those in computer communications as a closed architecture, encouraging computer vendors to displace the PSTN by creating overlay networks which avoid capitalizing on any more than core PSTN functionality.

Call routing using an overlay network requires many additional connections to the PSTN for both access and egress. Besides, routing within the PSTN from overlay networks often leaves connections established in nodes that are redundant to the call path. In overlay networks where there are limited connection points to the PSTN, calls can be routed over significant distances even though a call may complete on a network switching node where it originated. To address this problem, the telephone industry has endorsed the solution of release link trunk functionality for subsequent routing or rerouting of calls. The release link trunk functionality can reside in either the PSTN or in an overlay network, but the release link feature can only reside within a network switching node. The release link feature permits data messaging, usually SS7 ISUP messaging, to release a call back to the call set-up point, where rerouting can be performed to redirect the call. This feature is in wide use in the telecommunications industry today. Although the release link feature resolves some of the problems associated with redundant connections in the call path, the fact that it is a switching node resident is a significant drawback. Switch development and differences in proprietary protocols limit the use and availability of release link features.

In order to overcome the drawback, the applicant's co-pending U.S. patent application, Ser. No. 08/939,909 entitled METHOD AND APPARATUS FOR DYNAMICALLY ROUTING CALLS IN AN INTELLEGENT NETWORK, and filed on Sep. 29, 1997, which is incorporated herein by reference, discloses a method and apparatus for dynamically re-routing calls through the network without disconnection of the calling party in response to any pre-defined criteria. The re-routing is achieved using standard common channel signaling messages formulated at a call control node which is a virtual node in the switching plane and a physical node in the signaling plane of the network. A Virtual Switch Point (VSP) or Intelligent Signaling Transfer Point (ISTP) is used as the call control node and the calls are routed to the VSP or ISTP using dedicated trunk groups which may be loop-back ISUP trunks or inter-switch ISUP trunks. The calls are routed to the dedicated trunk groups using standard routing translation tables and methods.

The method and apparatus disclosed in the applicant's co-pending United States patent application provides a new level of flexibility in call routing control that permits the rapid introduction of new services. However, in order to capitalize on the full potential of this new facility, it must be ubiquitously available in the network. Consequently, there exists a need for a switched telephone network which enables point of origin control for selected calls, enhanced application development and, if resources permit, point of origin control for all inter-switch calls.

OBJECTS OF THE INVENTION

It is an object of the invention to provide an enhanced application switched telephone network and a method of handling selected calls associated with services provided in the network which enables point of origin control of the selected calls.

Another object of the invention is to provide a method for controlling selected calls associated with special services provided in the enhanced application switched telephone network to alleviate congestion on network facilities.

It is a further object of the invention to provide an enhanced application network in which regular calls may be overflowed to enhanced trunks when regular trunks are all busy.

It is another object of the invention to provide an enhanced application network in which special service calls are selectively controlled by call control nodes in the network.

It is a further object of the invention to provide an enhanced application network in which call control nodes cooperate with intelligent peripherals to provide enhanced application services.

It is yet another object of the invention to provide an enhanced application network in which all high usage trunk groups are enhanced trunk groups associated with call control nodes.

It is yet a further object of the invention to provide an enhanced application network in which all trunk groups interconnecting local switching offices and tandem switching offices are enhanced trunk groups associated with call control nodes.

SUMMARY OF THE INVENTION

In accordance with one aspect of the invention, there is provided an enhanced application telephone network having switching offices connected by trunk groups and enabled to communicate over a common channel signaling network to exchange call control messages for calls handled by the trunk groups, comprising:

a call control node connected to the common channel signaling network and configured as a virtual node in a switching plane of the enhanced application telephone network; and at least one enhanced trunk for handling selected calls connected to each local switching office, the call control node being a virtual switching node logically located between opposite ends of the enhanced trunk so that common channel signaling messages related to the selected calls are delivered to the call control node, and the call control node is thereby enabled to exercise control over the selected calls.

In accordance with another aspect of the invention, there is provided a method for controlling a selected call associated with special services provided in a switched telephone network wherein a caller dials a predetermined sequence of digits for one of the selected calls, comprising steps of:

routing the selected call from an originating switching office that serves the caller to a trunk member that is connected to the originating switching office, the trunk member logically terminating at a call control node that is connected to a common channel signaling is network of the switched telephone network;

receiving at the call control node a common channel signaling message from the originating switching office, the common channel signaling message being related to the selected call;

determining at the call control node if the selected call is associated with a special service using information in the common channel signaling message;

if the selected call is associated with a special service, determining a call treatment option for the call, else forwarding the common channel, signaling message to a switching office associated with an opposite end of the trunk member; and controlling the selected call associated with the special service using at least one common channel signaling message sent to a switching office connected to an end of the trunk member.

In the enhanced application telephone network call control nodes are advantageously enabled to exercise control of selected calls before the calls are routed through the network. As a result, the proportion of call processing in the PSTN related to blocked or failed call attempts is significantly reduced. Redundant circuits used to route selected calls to an enhanced trunk for control by a call control node are also eliminated. Therefore, the telephone network operates more efficiently and congestion in the network is reduced. Moreover, the enhanced application network enables the provision of an unknown number of new services, as well as a more intelligent provision of known services in the network.

In the enhanced application network every local switching office is provided with at least one enhanced trunk. An enhanced trunk is a regular voice-grade ISUP trunk having an associated link set and route set that directs common channel signaling messages to a call control node when a call is routed to the enhanced trunk. The call control node is therefore enabled to exercise control over the call before the call is progressed beyond the local switching office. Call treatment and service enablement is limited only by applications deployed on the call control node. Service enablement is further enhanced by providing the call control node with a data interface that permits communication with intelligent peripherals, application servers or other service resources directly or indirectly integrated into the enhanced application telephone network Computer telephony integration is thereby enabled without network overlays or redundant circuit use.

In a fully developed enhanced application network all outbound trunks from each local switching office are enhanced trunks. Translation tables and call routing decisions in the local switching offices are therefore simplified and exclusion tables at the call control nodes enable rapid call processing to permit regular calls to be passed through the call control node without appreciable delay.

Traditionally, IP integration in telephone switches has been accomplished using separate data channels into each telephone exchange. Most switch vendors now provide an IP data connection that permits some level of call control. This approach requires a separate OSS system and procedure to control t he overlay data network. The present invention capitalizes on existing signalling (specifically SS7) and uses that existing SS7 network to perform control functions. An OSS system is not required because SS7 has one of the most comprehensive OSS systems available in the PSTN.

BRIEF DESCRIPTION OF THE DRAWINGS

The invention is now further explained by way of example only and with reference to the following drawings in which.

DETAILED DESCRIPTION OF THE PREFERRED EMBODIMENT

Figure 1:
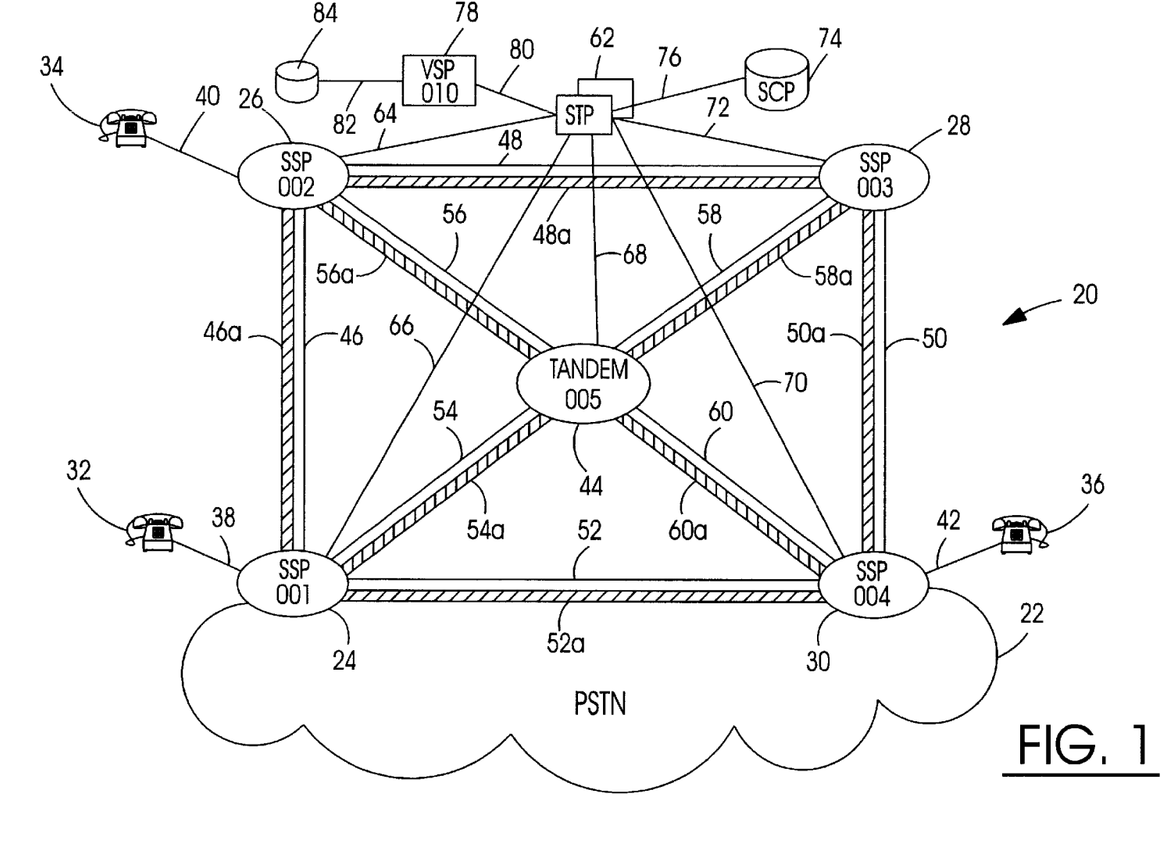
FIG. 1 is a schematic diagram of a preferred embodiment of the invention, showing an enhanced application telephone network having at least one enhanced ISUP trunk for handling selected calls included in each outbound interoffice ISUP trunk group associated with local switching offices in the network.

FIG. 1 schematically illustrates a portion of an enhanced application telephone network in accordance with the invention, generally indicated by reference numeral 20. The network 20 is part of a Public Switched Telephone Network (PSTN) 22 and includes a plurality of switching offices 24, 26, 28 and 30, for example. Each of these switching offices serves as a local switching office which is connected to a plurality of subscriber telephone lines, lines 38, 40 and 42 which serve telephones 32, 34 and 36, respectively. The network 20 also includes a plurality of tandem switching offices which are well known in the art. Only one tandem switching office 44 is shown. The switching offices 24–30 and the tandem switching office 44 are interconnected by trunk groups, indicated by the reference numerals 46, 48, 50, 52, 54, 56, 58 and 60 to form a switched network for handling telephone calls. Each of the trunk groups includes a plurality of trunk members to ensure that the network has the capacity to handle a certain volume of call traffic to meet the requirements of service agreements.

The network 20 further includes a common channel signaling network which includes a plurality of Signaling Transfer Points (STPs) arranged in redundant pairs. Only one STP pair 62 is shown. The STP pair 62 is connected to the respective switching offices by signaling links 64, 66, 68, 70 and 72. Each of the switching offices 24 to 30 and the tandem switching office 44 are enabled to formulate and exchange common channel signaling messages for routing and controlling calls handled by the network 20.

A Service Control Point (SCP) 74 is connected by a signaling link 76 to the SS7 network to provide database and transaction capability for various centralized services, which are well known in the art. Each switching office enabled with a Transaction Capability Application Part (TCAP) formulates queries to obtain call routing information and the like, and sends those queries through the common channel signaling network to the SCP 74. The SCP 74 responds to the queries in a manner well known in the art.

A Virtual Switching Point (VSP) 78, which functions as a call control node in the enhanced application network 20 is connected by a signaling link 80 to the SS7 network. As described in the applicant's co-pending U.S. patent application Ser. No. 08/939,909, the VSP 78 facilitates the introduction of new services in the telephone network.

The VSP 78 acts as a virtual switching node for controlling selected calls associated with the services without modifying facilities associated with the switching offices. The VSP 70 may be enabled to provide call routing information and to exercise control over a call during an entire call session, if desirable. The VSP 78 includes a common channel signaling interface for receiving messages from and sending messages through the SS7 network; a memory for storing at least one of the SS7 messages; a memory for storing programs enabling a processor to examine SS7 messages received at the common channel signaling interface, generate SS7 signaling messages for controlling call connections, tracking calls virtually routed through the VSP and assessing pre-defined criteria to determine an action respecting the control of call connections; and, a processor for executing the programs. The VSP 78 may further be connected by link 82 to a database 84 of information used for defining services associated with the selected calls it controls.

In order to enable the VSP 78 to be logically connected to selected trunks at each of the local switching offices 24 to 30, at least one outbound member of each of the trunk groups 46 to 60 is designated an Enhanced ISUP (EISUP) trunk, indicated respectively by reference numerals 46a, 48a, 50a, 52a, 54a, 56a, 58a and 60a. The EISUP trunks are no different than any other ISUP trunks except that route sets and link sets associated with the trunks route common channel signaling messages for calls routed through the EISUP trunks to the VSP 78.

Selected calls may be routed to the EISUP trunks in any one of several ways well understood in the art. For example, calls may be routed to the EISUP trunks using switch-resident routing tables. This method is particularly well adapted for special service calls distinguished by a distinctive NNX code.

Intelligent network routing methods may be used to retrieve routing information from the SCP 74 in an alternate method of routing calls to the EISUP trunks. In an Advanced Intelligent Network (AIN), the local switching offices may be enabled with AIN triggers which permit predetermined dialing sequences to trigger common channel signaling queries to the SCP 74 or an ISCP (not illustrated) for routing information to route the selected calls to the EISUP trunk(s). This method is also well understood in the art.

When a call is routed to an EISUP trunk member, the originating local switching office (24–30) seizes an outbound end of one of the EISUP trunks and formulates an initial SS7 ISUP Initial Address Message (IAM) to initiate the call. As is well understood, the IAM includes an Originating Point Code (OPC), a Destination Point Code (DPC) and a Circuit Identification Code (CIC), as well as other information required for call processing. The OPC in the initial IAM is the point code of the originating local switching office. The DPC is the point code of the VSP 78, which is obtained from a link set and route set associated with the EISUP trunk. The CIC identifies the particular enhanced ISUP trunk member seized for the call. The originating office transmits this initial IAM through the common channel signaling network to the VSP 78. The VSP 78 examines the initial IAM to determine if it relates to a special service call and assumes control over the selected call if the call relates to a special service. Various control options may be taken by the VSP 78 depending on the special service and the dynamic status of the network facilities, as will be further explained below by way of example. As used in this document, "special service call" refers to any call which is routed over an EISUP trunk member, provided that the call is not a Plain Old Telephone Service (POTS) call overflowed to the EISUP trunk, as will be explained below in more detail.

To efficiently use the network facilities, each of the local switching offices 24 to 30 is enabled to route a regular call to the EISUP trunk if other ISUP trunks are all busy. Overflow to reserved trunks is well understood in the art. In an overflow situation, the VSP 78 behaves much like an STP 62 rather than a call control node in that the VSP 78 simply forwards control messages related to POTS calls to a switching office at a terminating end of EISUP trunk. As explained in applicant's co-pending patent application, Ser. No. 08/939,909, the VSP 78 is required to change the OPC and DPC of each message before the message is forwarded.

Figure 2:
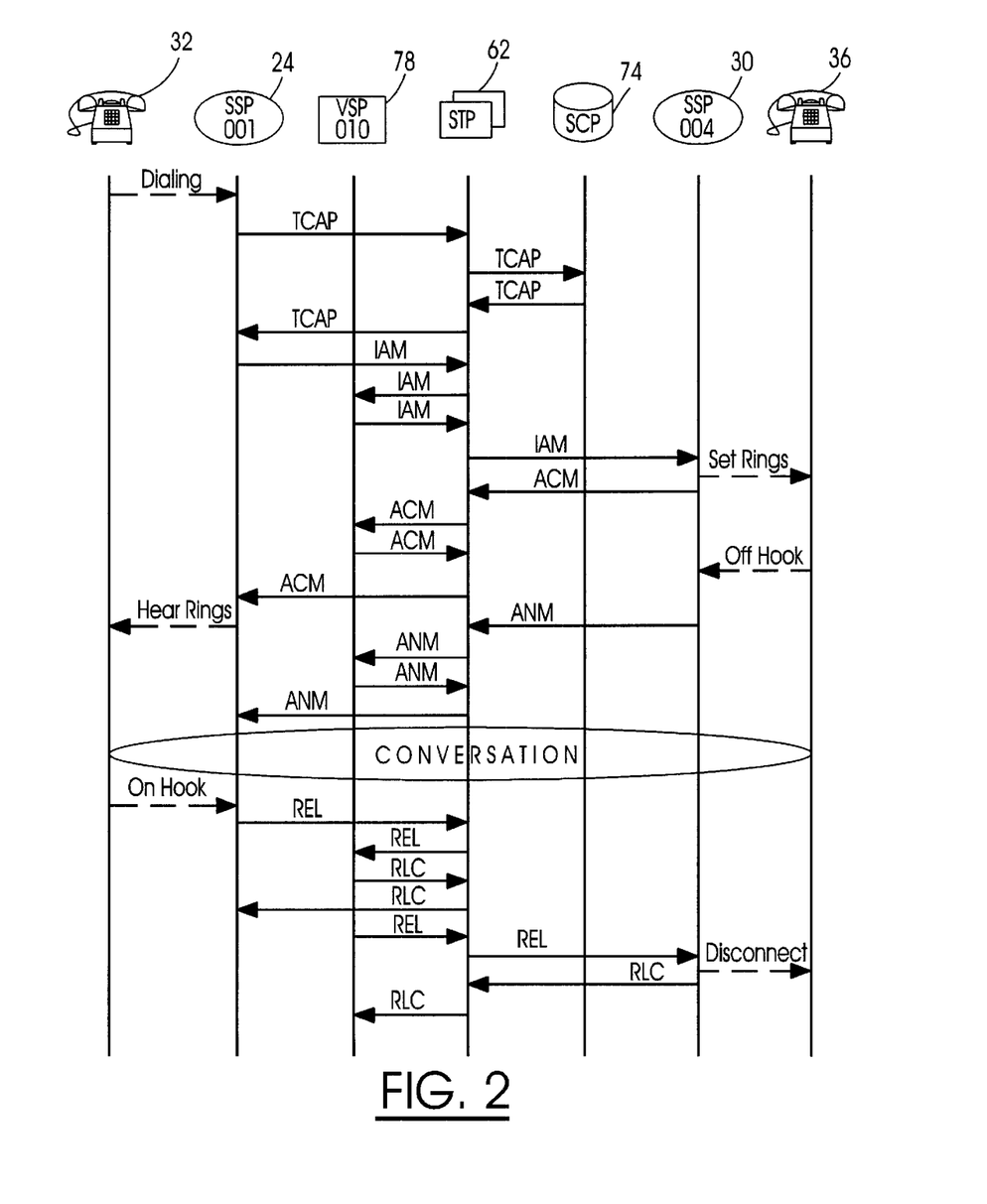
FIG. 2 is a call flow diagram, showing a sequence of control messages for a selected call handled by the network shown in FIG. 1.

Several simple examples of the use of the enhanced application network shown in FIG. 1 for special service call completion will now be described FIG. 2 illustrates a sequence of control messages for a special service call made by a caller from a telephone 32. For the purpose of illustration, it is assumed that dialed digits force the local switching office 24 to perform a database dip for routing information. Upon receipt of the dialed digits, the switching office 24 formulates an SS7 TCAP query and transmits the query through signaling link 66, STP 62 and signaling link 76 to the SCP 74. After processing the query, the SCP 74 returns an SS7 TCAP message to the switching office 24 through signaling link 76, STPs 62 and signaling link 66. The SS7 TCAP message includes routing information which indicates that this selected call should be routed to an enhanced ISUP trunk. As is well understood the routing information may be, for example, a switch and trunk ID. Accordingly, the switching office 24 formulates an SS7 ISUP IAM message including an OPC 001 (switching office 24), DPC 010 (VSP 78) and CIC 052 (EISUP 52). The IAM message is sent through signaling link 66, STP 62 and signaling link 80 to the VSP 78. On receipt of the IAM, the VSP 78 extracts the dialed digits and verifies that the dialed digits relate to a special service call. In this example, the special service subscriber is a local business in the business of food services. In order to ensure efficient and fast delivery of its products, callers using a single access number are automatically routed to the nearest available outlet. Since all calls placed using the single access number are routed on enhanced ISUP trunks monitored by the VSP 78, the VSP 78 can track the availability of each outlet and its current status. This information is stored, for example, on database 84 as explained in applicant's co-pending patent application referred to above. After querying database 84 using the information included in the IAM message, the VSP 78 makes a control decision to route the call to the telephone 36, which is an outlet near the caller and available to respond to the caller at telephone 32.

In response to the control decision, the VSP 78 modifies the IAM message so that the OPC and the DPC are changed to 010 and 004 respectively. The CIC remains unchanged. The modified IAM message is sent from the VSP 78 through the signaling link 80, STP 62 and signaling link 70 to the switching office 30, which responds by seizing the inbound end of the enhanced ISUP trunk 52a. After translating the called number in a manner well known in the art, the switching office 30 verifies the availability of the line 42 and sets rings on the line 42 of telephone 36. The switching office 30 then formulates an SS7 Address Complete Message (ACM) with OPC=004 and DPC=010 and transmits the ACM back to the VSP 78 through a reverse route in the common channel signaling network. The VSP 78 modifies the ACM message by changing the OPC and the DPC to 010 and 001 respectively, and transmits the modified ACM message through signaling link 80, STP 62 and signaling link 66 to the originating switching office 24. The caller at the telephone 32 hears the rings at his telephone handset as a connection is completed through the network on receipt of the ACM. Meanwhile, the switching office 30, on sensing an off-hook signal on the line 42, formulates an SS7 Answer Message (ANM). The ANM message follows a same message path as the ACM to the switching office 24. The connection between telephone 32 to telephone 36 is thus completed.

After the conversation between the telephone 32 and the telephone 36 is complete, the switching office 24 senses an on-hook signal on line 38 and formulates an SS7 Release message (REL) having an OPC 001, DPC 010 and CIC 052, and transmits the REL message through signaling link 66, STP 62 and signaling link 80 to the VSP 78. On receipt of the REL message, the VSP 78 formulates and returns a Release Complete message (RLC) to the switching office 24. The VSP thereafter modifies the REL message and transmits the REL message through signaling link 80, STP 62 and signaling link 70 to the switching office 30. The switching office 30 then disconnects the line 42, releases the trunk member 052, and formulates a Release Complete message (RLC) having an OPC 004, DIPC 010 and CIC 052. The RLC message is transmitted from the switching office 30 through signaling link 70, STP 62 and signaling link 80 to the VSP 78 which discards the RLC message, in accordance with standard procedures. On receipt of the RLC, the VSP 78 updates the status of the outlet at telephone 36 to indicate that it is available to handle a next call.

Figure 3:
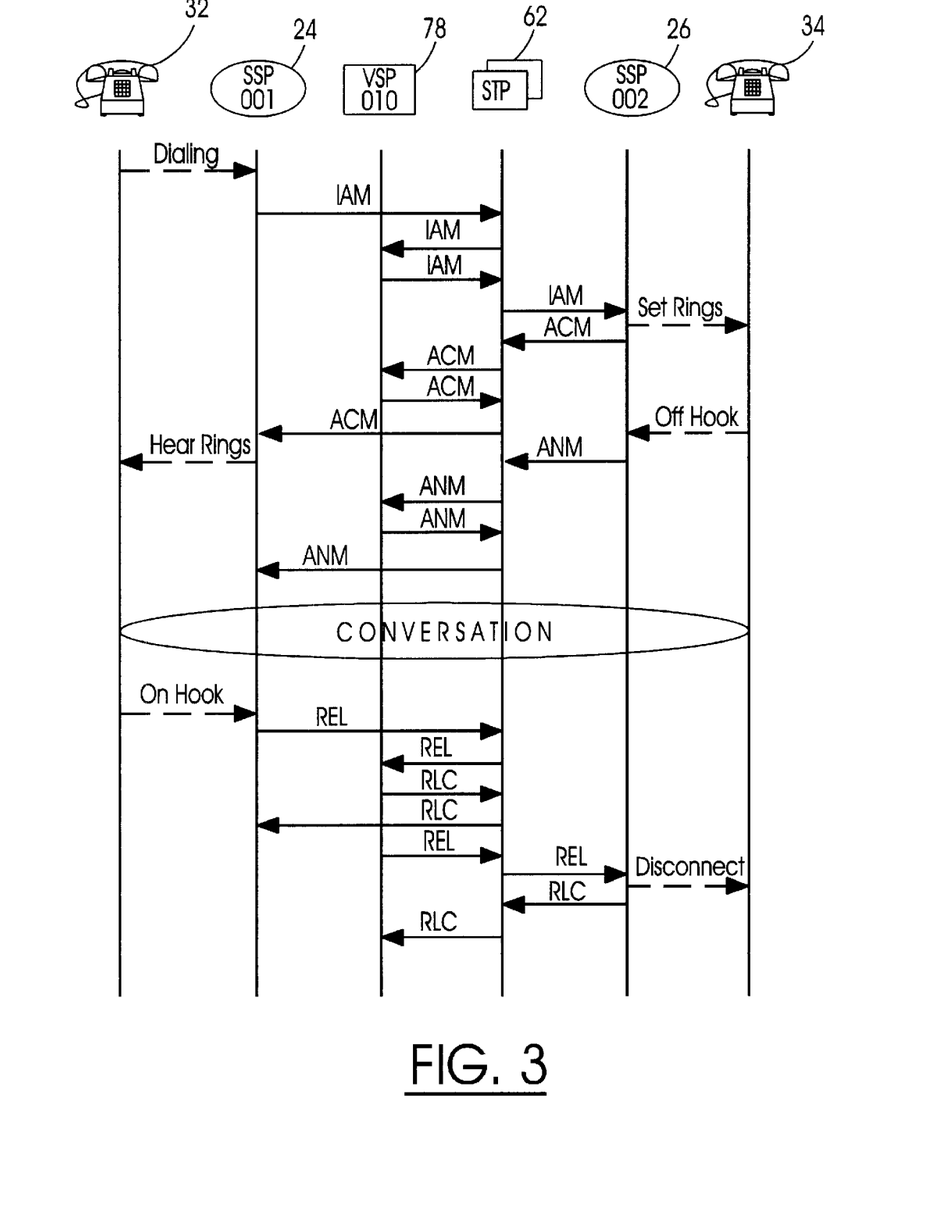
FIG. 3 is a call flow diagram, showing a flow sequence of control messages for a regular call overflowed to an enhanced ISUP trunk in the network shown in FIG. 1.

FIG. 3 illustrates a sequence of call control messages in an instance when a POTS call is overflowed to an EISUP trunk because all regular trunks are busy. The switching office 24 receives digits dialed by a caller at the telephone 32. The dialed digit translation tables indicate that the dialed digits are for a POTS call which should be routed to the inter-switch trunks 46. However, the ISUP trunk group 46 between the switching offices 24 and 26 are all busy, as explained above. The switching office 24 is enabled to overflow POTS calls to the EISUP trunk 46a. Therefore, the switching office 24 seizes an EISUP trunk member from the trunk group, 46a, and formulates an IAM message having an OPC 001, OPC 010 and CIC 046 which represents the EISUP trunk 46a. From the information included in the IAM message the VSP 78 determines that the call is a POTS call to be routed to switching office 26. Accordingly, the VSP 78 modifies the IAM message to include OPC 010 and DPC 002 and transmits the modified IAM message through the STP 62 to the switching office 26. Upon receipt of the modified IAM message, the switching office 26 verifies the availability of the telephone line 34, seizes EISUP trunk 46a and connects the line 40, setting rings on the line 40. The remaining message sequence for the call shown in FIG. 3 is similar to the corresponding portion of FIG. 2, except that the destination switching office and the called telephone are different.

Figure 4:
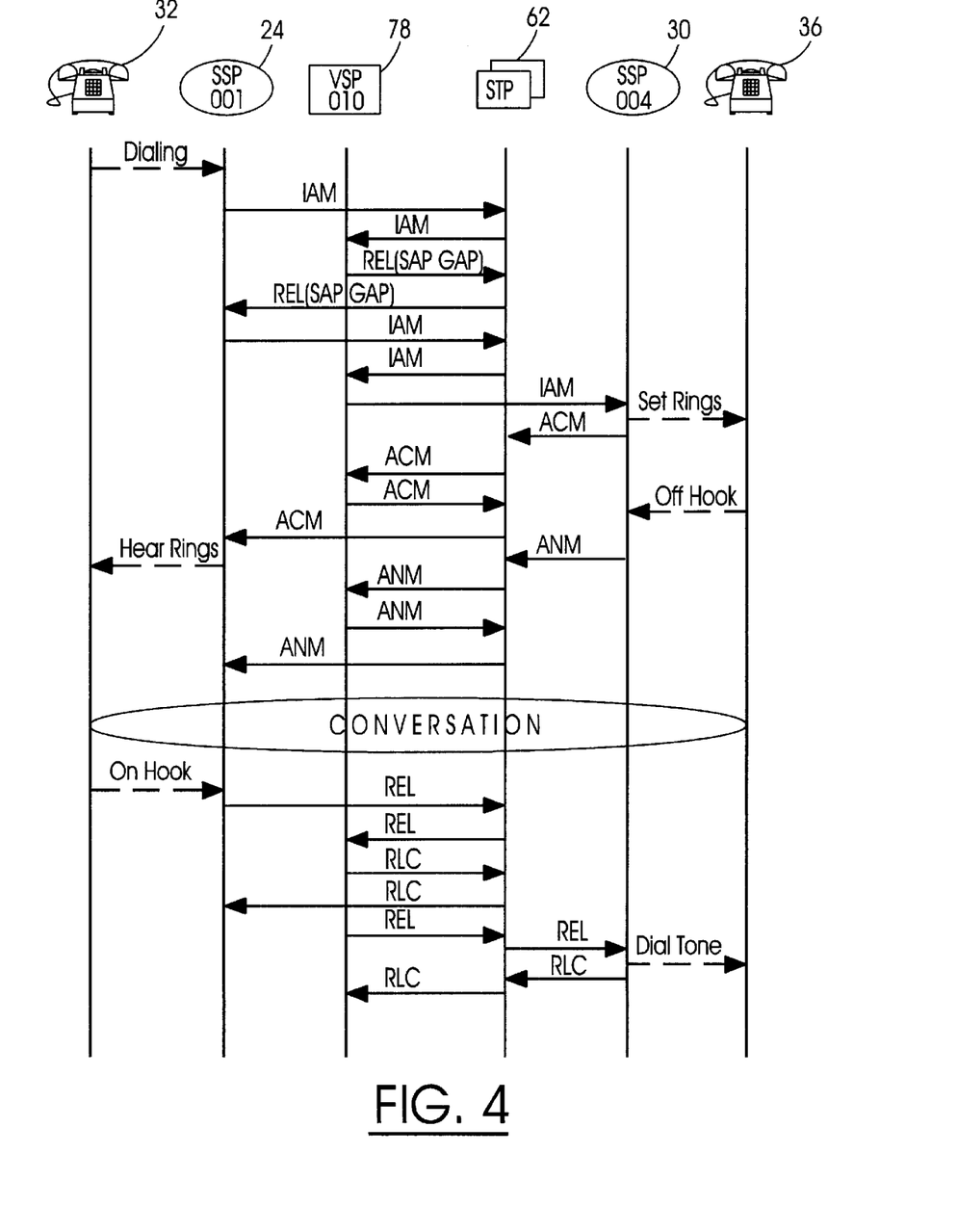
FIG. 4 is a call flow diagram, showing a sequence of control messages for a selected call handled in the network shown in FIG. 1, in which the call is re-routed to an alternate enhanced ISUP trunk.

The following example further illustrates the advantages of control by the VSP 78 over special service calls. As shown in FIG. 4, a caller at telephone 32 dials digits to call a subscriber telephone 34 serviced by the local switching office 26 (FIG. 1). However, the subscriber subscribes to a call forwarding service. In the enhanced application network, call forwarding is conveniently controlled by the VSP 78. With a prior art call forwarding service, the call from telephone 32 is routed from switching office 24 to the switching office 26, and then re-routed through the tandem switching office 44 to the switching office 30 to set-up the call from the caller at telephone 32 to the subscriber at telephone 36. If the VSP 78 is enabled to control the call, the same call is routed directly from switching office 24 to switching office 30 and only one trunk 52 is used for call completion. Several known methods can be used to route a call to a call forwarding subscriber to an EISUP trunk. Such methods are known and therefore not described here. The sequence of call messages is shown in FIG. 4. As described above, the switching office 24 formulates an SS7 IAM message including an OPC 001, DPC 010 and CIC 046, after the switching office 24 receives the dialed digits from the telephone 32. The IAM message is transmitted from the switching office 24 through signaling link 66, STP 62 and signaling link 80 to the VSP 78 which queries the database 84 and determines that calls to the telephone 34 should be forwarded to a telephone 36 served; by SSP 30 (FIG. 1). Since further control of the call is not required, the VSP makes a control decision to route the call from the originating switching office 24 directly to the switching office 30 that serves the telephone 36.

Accordingly, the VSP 78 formulates an SS7 REL message including a Service Activation Parameter (SAP) and a Generic Address Parameter (GAP). The REL message includes information to release the EISUP trunk 46a that was seized on its outbound end by the switching office 24. The SAP includes information to invoke the switching office 24 to formulate a new IAM message for the call set-up and the GAP identifies the address to which the new call is to be completed. The REL (SAP, GAP) from the VSP 78 is transmitted back to the switching office 24. The switching office 24 receives the REL (SAP, GAP) message and initiates actions accordingly. Since the call forward number is not associated with a special service, the call is completed using a, member of trunk group 52 (FIG. 1), thus conserving the EISUP trunk group 52a for special service calls. The remaining portion of the call message sequence shown in FIG. 4 is the same as the corresponding portion shown in FIG. 2, and a description of the call message sequence is not represented here.

Figure 5:
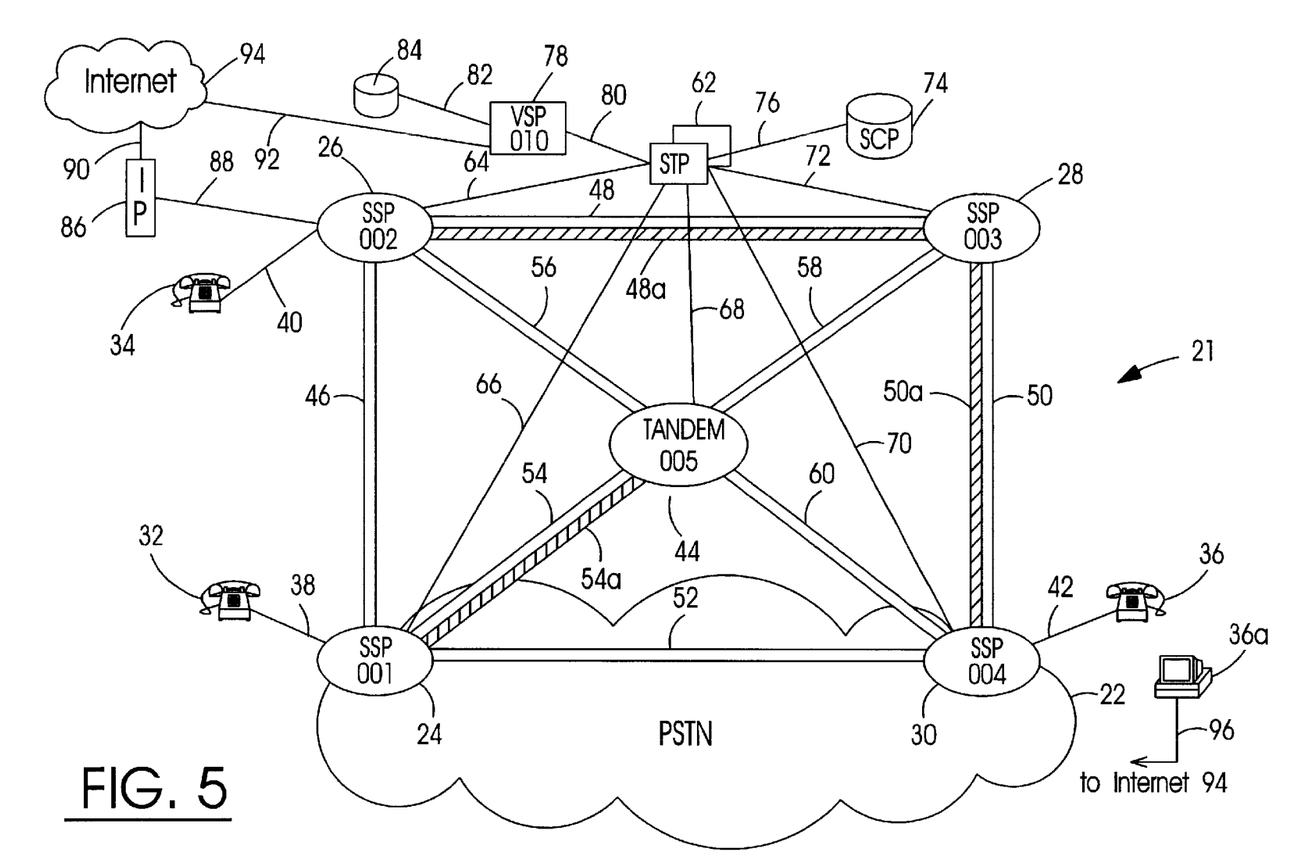
FIG. 5 is a schematic diagram of another preferred embodiment of the invention, showing an enhanced application telephone network having only one enhanced ISUP trunk connected to each local switching office in the network.

FIG. 5 illustrates another configuration for an enhanced application network 21 in which each of the local switching offices 24–30 is provided with only one EISUP trunk group. For the purposes of illustrating the enhanced application shown in FIG. 5, network 21 also includes an Intelligent Peripheral (IP) 86, such as Interactive Voice Response unit (IVR), the IP 86 being connected to the VSP 78 by data links 90 and 92 and a data network such as the Internet 94. As will be understood by those skilled in the art, the use of intelligent peripherals is common in the PSTN and the enhanced application network architecture shown in FIG. 5 is in no way dependent on the use of intelligent peripherals.

Figure 7:
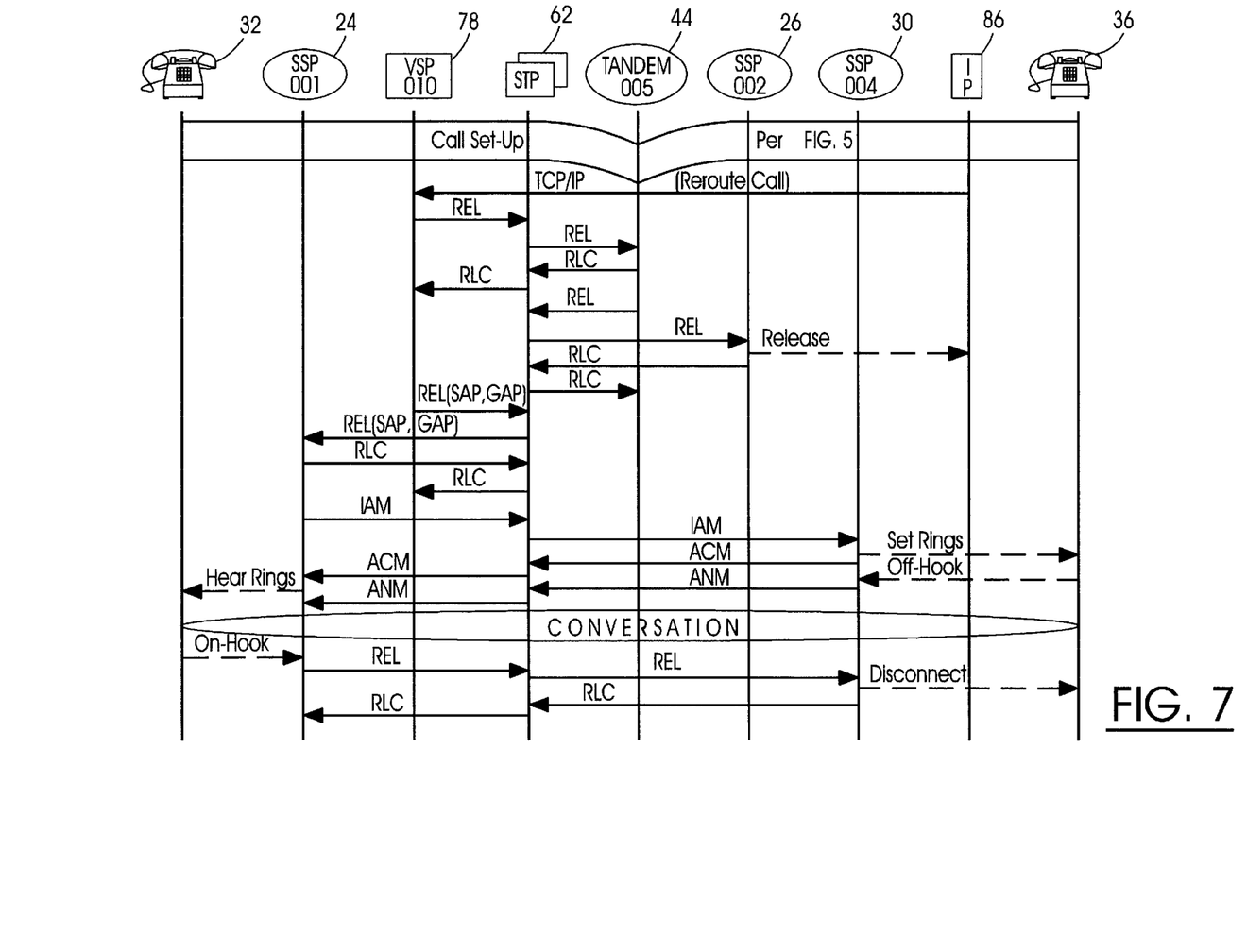
FIG. 7 is a call flow diagram, showing a sequence of control messages for continuing the selected call shown in FIG. 6 in accordance with one routing option.
Figure 8:
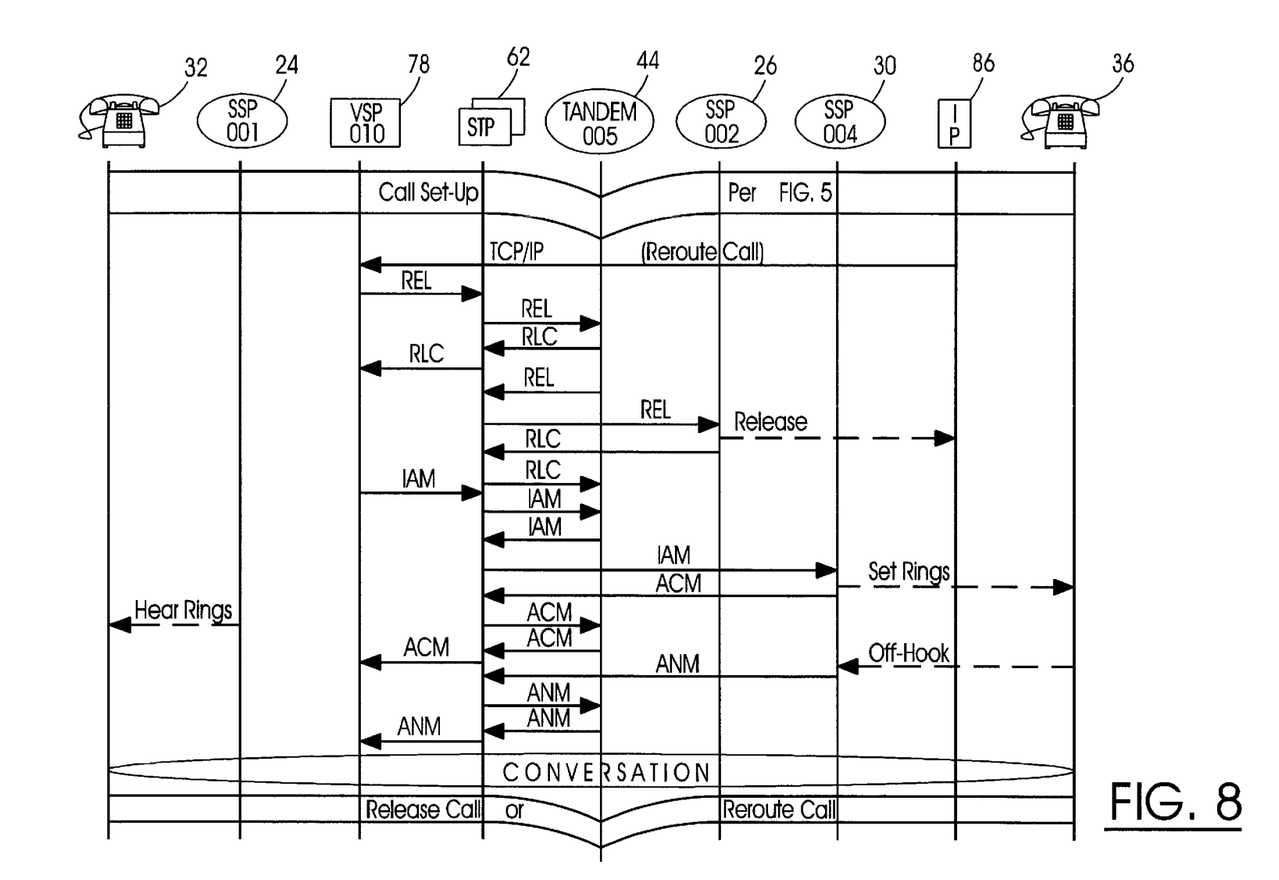
FIG. 8 is a call flow diagram, showing a sequence of control messages for continuing the selected call shown in FIG. 6 in accordance with another routing option.

A further example is given below to, illustrate the control that may be exercised over selected calls in the enhanced application network 21 shown in FIG. 5. The call control message sequences illustrating this example are shown in FIGS. 6 to 8.

Figure 6:
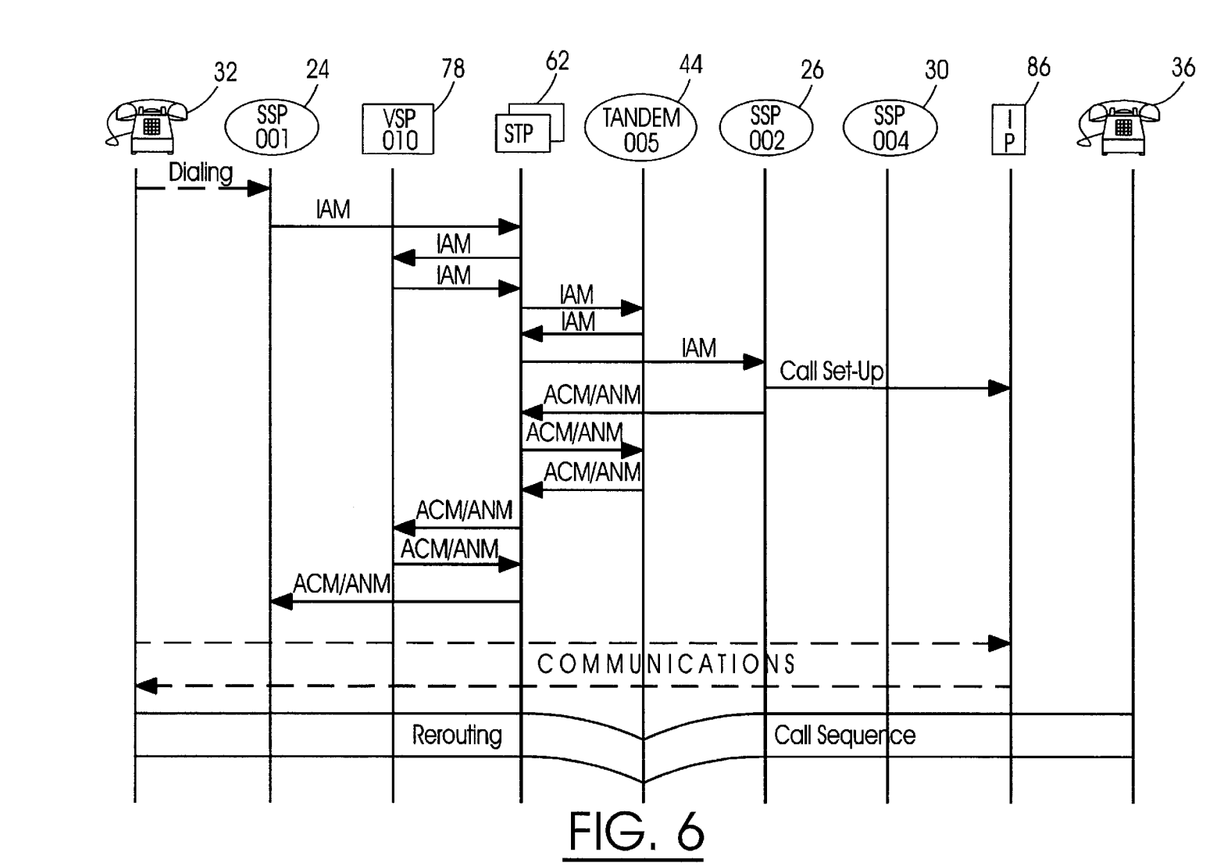
FIG. 6 is a call flow diagram showing a sequence of control messages for a selected call handled by the network shown in FIG. 5 in which a caller communicates with an Intelligent Peripheral (IP) to obtain information used to route the call to an appropriate termination.

As shown in FIG. 6, a caller at telephone 32 dials digits associated with a special service, in this case an access number for a product support center in which product support personnel are located in different offices. The translation tables of the switching office 24 may direct the call to the EISUP trunk group 54a. Alternatively, the dialed digits may be associated with an AIN trigger or the like, to permit routing information to be retrieved from a central database, as explained above. An IAM message formulated at the switching office 24 includes OPC 001, DPC 010 and CIC 054 which directs the call to an EISUP trunk member 54a connected to the switching office 24. The VSP 78 receives the IAM message transmitted from the switching office 24 through the signaling link 66, STP 62 and signaling link 80. On receipt of the IAM, the VSP 78 queries database 84 (not illustrated) to determine whether the dialed digits relate to a special service. The database 84 indicates that the dialed digits in the IAM message relates to the product support service and the dialed digits route the call to the IP 86 in order to determine which product support person is best suited to serve the calling party. The VSP therefore simply forwards the IAM to the tandem switch 44. Before the IAM can be forwarded, the VSP 78 modifies the OPC and DPC so that the OPC is 010 (VSP 78) and the DPC is 005 (tandem switching office 44). Upon receipt of the modified IAM message from the VSP 78, the tandem switching office 44 seizes an inbound end of the EISUP trunk 54a and one end of an available member (561, for example) of ISUP trunk group 56, and modifies the received IAM message with OPC 005, DPC 002 and CIC 561. The tandem switching office 44 transmits that IAM message through, A-link 68, STP 62 and A-link 64 to the switching office 26.

In response to the IAM message, the switching office 26 seizes the inbound end of the corresponding ISUP trunk, and consults its translation tables which indicate that the call should be routed via trunk group 88 to the IP 86. The switching office 26 formulates an ACM message and ANM message, and transmits those messages respectively by a reverse route to the local switching office 24. Communications between the caller at the telephone 32 and the IP 86, are thus established.

In this example, the IP 86 is an IVR which plays a voice recording to prompt the caller to select a specific support requirement from a menu of options using the telephone key pad.

FIG. 7 illustrates a continuation of the control message sequence shown in FIG. 6. After the caller at telephone 32 has selected an option from the menu provided by the IVR (IP 86), the IP 86 sends a TCP/IP message through data link 90, the Internet 94 and data link .92 to the VSP 78 to provide information respecting the option selected by the caller. As explained in applicant's co-pending patent application referenced above, the TCP/IP message also includes information to permit the VSP 78 to relate the data message to a call trace table maintained by the VSP 78. Upon receipt of the TCP/IP message from the IP 86, the VSP 78 exercises control of the call using various options. The TCP/IP message indicated that a support person at telephone 36 is best suited to handle the product support inquiry from the caller. The person at telephone 36 is equipped with a Personal Computer (PC) 36a that has access to the Internet 94 through a link 96 which may be, for example, a dial-up connection ISDN link or the like. The PC 36 may receive information collected from the caller by the IP 86. Such information is transferred through the Internet 94 via link 96. The PC 36 may also be enabled to send call transfer requests to the VSP 78. Such requests are used when a support person needs the expertise of a co-worker located in a different office, for example.

When the VSP 78 receives the information respecting the option selected by the caller at IP 86, the VSP must make a routing decision respecting how the call will be completed. Two options are available. The VSP may route from the originating switching office 34, thus freeing up the EISUP trunk member for use by another call. Alternatively, the VSP 78 may route from the tandem switching office 44 and thus maintain control of the call so that the VSP 78 can respond to subsequent transfer requests and the like. The first routing option is illustrated in FIG. 7. As shown in FIG. 7, the VSP 78 routes the call directly from the originating switching office 24 to the switching office 30 because according to statistical data, for example, less than 5% of, the calls for this type of support require transfer to another specialist. The VSP 78 therefore formulates an SS7 ISUP Release message (REL) with Cause set to Normal Clearing, and transmits the REL message through the signaling link 80, STP 62 and signaling link 68 to the tandem switching office 44. The tandem switching office 44 releases the member of ISUP trunk group 56 and the EISUP 54*a*, and formulates an SS7 Release Complete message (RLC) that is transmitted back in a reverse route to the VSP 78. Meanwhile, the tandem switching office 44 formulates an REL message and transmits the REL message through the signaling link 68, STP 62 and signaling link 64 to the switching office 26 to enable the switching office 26 to release the member of ISUP trunk group 56 and the trunk 88. After releasing the member of ISUP trunk group 56 and the trunk 88, the switching office 26 formulates an SS7 RLC message and transmits the RLC message back in a reverse route to the tandem switching office 44. Meanwhile, the VSP 78 formulates another SS7 REL message which it sends to the originating switching office 24. This REL message includes an ISUP Service Activation Parameter (SAP) and Generic Address Parameter (GAP) which invoke the originating switching office 24 to set-up a new call to the switching office 30 without releasing the calling party. When the originating switching office 24 receives the SS7 REL (SAP, GAP) from VSP 78 through the signaling link 80, STP 62 and the signaling link 66, the switching office 24 releases the EISUP trunk 54*a* and formulates an RLC to the VSP 78 to acknowledge the release of the EISUP trunk 54*a*, while formulating an SS7 IAM message including an OPC 001, DPC 004 and CIC 521, for example, which represents an available member of ISUP trunk group 52 which was seized for the call. When the switching office 30 receives the IAM message from the originating switching office 24, it checks the availability of the subscriber line 42, and formulates an SS7 ACM message which is transmitted back in a reverse route to the switching office 24. The switching office 30 then seizes the ISUP trunk member 521, connects it to the telephone line 42, and applies rings to the telephone 36. Upon receipt of an off-hook signal, the switching office 30 formulates an SS7 ANM message and transmits the ANM message back to the switching office 24. The call between the telephone 32 and the telephone 36 is no longer under the control of the VSP 78 because there is no EISUP trunk involved in this call route and the SS7 messages for the call do not pass through the VSP 78. After the conversation between the telephone 32 and the telephone 36 is complete, the telephone connection is disconnected and the trunk 521 is released in accordance with normal ISUP procedures. The message flow of the REL and RLC messages used in the call release are shown in the FIG. 7, but are not further described.

FIG. 8 illustrates the second routing option after the caller at telephone 32 communicates with the IP 86, as illustrated in FIG. 6 and described above. Upon receiving a TCP/IP message from the IP 86 through the data link 90 via the Internet 94, the VSP 78 consults the database 84 and determines that the call should be routed to the switching office 30 from the tandem switching office 44 so that control of the call can be maintained. Accordingly, the VSP 78 formulates an SS7 REL message including an OPC 010, a DPC 005 and a CIC 561 and transmits an REL message through the signaling link 80, STP 62 and signaling link 68 to the tandem switching office 44. After receiving the REL message and releasing the seized member of the ISUP trunk group 56, the tandem switching office 44 formulates an RLC message and returns it on the reverse route to the VSP 78 to acknowledge the release. The tandem switching office 44 then formulates an REL message and transmits the REL message through signaling link 68, STP 62 and signaling link 64 to the switching office 26 to prompt the switching office 26 to release the seized member of the ISUP trunk group 56 and the trunk 88.

Concurrently, VSP 78 formulates an SS7 IAM message and transmits the IAM message to the tandem switching office 44 via the STP 62. After the tandem switching office 44 receives the IAM message and consults its translation tables, it seizes an available member of the ISUP trunk group 60 having a CIC 601, for example, and formulates an IAM message with OPC 005, DPC 004 and CIC 601. The IAM message is transmitted from the tandem switching office 44 through signaling link 68, STP 62 and signaling links 70 to the switching office 30. On receiving the IAM message, the switching office 30 checks the availability of telephone line 42, and returns an ACM message on finding the line available. The tandem switching office 44 then seizes the corresponding member of the ISUP trunk identified by CIC 601 and connects it to the telephone line 42, setting rings to the telephone 36. When the telephone 36 is answered, the switching office 30 senses the off-hook signals from the telephone 36. The switching office 30 formulates an ANM message and transmits the ANM message back via the tandem switching office 44 and STP 62 to the VSP 78 where the IAM message is originated. The conversation between the telephone 32 and the telephone 36 begins when the support person answers the call at the telephone 36.

After the conversation is complete, the caller at telephone 32 may hang up the phone to terminate the call session and the release sequence is the same as shown in FIG. 7; or the support person at the telephone 36 may send a data message from the PC 36*a* through the Internet 94 to the VSP 78 requesting that the call be re-routed to another person on location. The VSP 78 is able to exercise control over the call because it is a virtual switching node in the EISUP trunk 54*a* that still remains part of the call connection.

The two network configurations described above, and the examples showing call control using those network configurations, are but a few simple examples used to illustrate the invention. As will be understood by persons skilled in the art, an enhanced application network in accordance with the invention can be configured in many ways, and the services that are enabled with an enhanced application network are too numerous to be described in any detail. The embodiments and applications described are therefore intended to be exemplary only. Changes and modifications may be made without departing from the basic principle and scope of the invention, which are limited only by the scope of the appended claims.

I claim:

1. An enhanced application telephone network having switching offices connected by trunk groups and enabled to communicate over a common channel signaling network to exchange call control messages for calls handled by the groups, comprising:

a call control node connected to the common channel signaling network and configured as a virtual node in a switching plane of the enhanced application telephone network;

a database of information used for defining services associated with the selected calls; the database being queried by the call control node to retrieve call routing information; and at least one enhanced trunk for handling selected calls connected to each local switching office, the call control node being a virtual switching node logically located between opposite ends of the enhanced trunk so that common channel signaling messages related to the selected calls are delivered to the call control node, and the call control node is thereby enabled to exercise control over the selected calls.

2. A network as claimed in claim 1 wherein each of the switching offices is enabled to overflow regular calls to the at least one enhanced trunk when other trunk groups are not available to handle the regular calls.

3. A network as claimed in claim 2 wherein each of the switching offices comprises translation tables including:
routing table entries to route the selected calls to the at least one enhanced trunk; and
link sets and route sets that direct common channel signaling messages formulated at the switching office for the selected calls to the call control node.

4. A network as claimed in claim 3 wherein the network further comprises a Service Control Point (SCP) for storing service information, including routing information.

5. A network as claimed in claim 4 wherein each of the switching offices is enabled to formulate common channel signaling queries to the SCP for routing information to route the selected calls to the at least one enhanced trunk.

6. A network as claimed in claim 5 wherein the switching office comprises Advanced Intelligent Network (AIN) triggers to permit the selected calls to trigger the common channel signaling queries.

7. A network as claimed in claim 5 wherein the formulation of common channel signaling queries is initiated by the translation tables.

8. A network as claimed in claim 1 wherein the call control node comprises:
a common channel signaling interface for receiving messages from and sending messages to the common channel signaling network;
a memory for storing at least one of the common channel signaling messages;
a memory for storing programs enabling a processor to examine common channel signaling messages received at the common channel signaling interface, generate common channel signaling messages for controlling call connections, tracking calls virtually routed through the call control node, and assessing predefined criteria to determine an action respecting the control of call connections; and
a processor for executing the programs.

9. A network as claimed in claim 1 wherein the call control node is assigned a service switching point code in the common channel signaling network and the call control node appears in the common channel signaling network as a Service Switching Point (SSP).

10. A network as claimed in claim 8 wherein the programs are further enabled to pass on certain common channel signaling messages received at the common channel signaling interface.

11. A network as claimed in claim 10 wherein at least some of the messages passed on are modified before they are transmitted into the common channel signaling network.

12. A network as claimed in claim 11 wherein the messages that are modified are modified only to an extent that the Originating Point Code and the Destination Point Code are changed to appear logically correct at a node that is a recipient of the message.

13. A network as claimed in claim 1 wherein the call control node further includes a connection to a data network not associated with the common channel signaling network.

14. A network as claimed in claim 13 further comprising service resources for providing services in the enhanced application network.

15. A network as claimed in claim 14 wherein the service resources include an Intelligent Peripheral (IP) that is connected to the data network to permit the call control node and the intelligent peripheral to exchange messages over the data network.

16. A network as claimed in claim 14 wherein the database of information used for defining services associated with selected calls is dynamically updated with data included in the common channel signaling messages received from the common channel signaling network and with data contained in messages, from the service resources transmitted through the data network.

17. A network as claimed in claim 14 wherein the call control node is enabled to initiate a call control action requested by a service resource using the data network.

18. A network as claimed in claim 1 wherein the trunk groups are Integrated Services Digital Network User Part (ISUP) trunks, and the at least one enhanced trunk is also an ISUP trunk.

19. A network as claimed in claim 2 wherein the call control node behaves like a Signal Transfer Point (STP) when regular calls are overflowed to the enhanced trunk.

20. A Method for controlling a selected call associated with special services provided in a switched telephone network wherein a caller dials a predetermined sequence of digits for one of the selected calls, comprising steps of:
routing the selected call from an originating switching office that serves the caller to a trunk member that is connected to the originating switching office, the trunk member logically terminating at a call control node that is connected to a common channel signaling network of the switched telephone network;
receiving at the call control node a common channel signaling message from the originating switching office, the common channel signaling message being related to the selected call;
querying a database from the call control node to determine if the selected call is associated with a special service using information in the common channel signaling message;
if it is determined that the selected call is associated with a special service, determining a call treatment option for the call, else forwarding the common channel signaling message to a switching office associated with an opposite end of the trunk member; and
controlling the selected call associated with the special service using at least one common channel signaling message sent to a switching office connected to an end of the trunk member.

21. A method as claimed in claim 20 wherein the step of determining a call treatment option for the call includes determining a terminating number for the selected call.

22. A method as claimed in claim 21 wherein the step of determining a call treatment option for the call further includes determining an availability of the terminating number to receive the call.

23. A method as claimed in claim 21 wherein the step of determining a call treatment option for the call further includes determining whether the selected call should be completed to or blocked from completion to the terminating number.

24. A method as claimed in claim 20 wherein the common channel signaling message used by the call control node to control the selected call is an ISUP Release message with Cause set to Normal Clearing, the Release message being transmitted to the originating switching office.

25. A method as claimed in claim 24 wherein the ISUP Release message includes a Service Activation Parameter (SAP) and a Generic Address Parameter (GAP) to invoke the originating switching office to reroute the selected call without disconnecting the caller.

26. A method as claimed in claim 24 wherein the common channel signaling message used by the call control node is an ISUP IAM message.

27. A method as claimed in claim 24 wherein the ISUP IAM message is transmitted to a switching office connected to a terminating end of the trunk member to advance the call in a forward direction while permitting the call control node to continue to exercise control over the call.

* * * * *